(12) United States Patent
Xiang et al.

(10) Patent No.: US 11,896,036 B2
(45) Date of Patent: Feb. 13, 2024

(54) GLUCOSYLATED TERPENE GLYCOSIDES

(71) Applicant: Firmenich SA, Satigny (CH)

(72) Inventors: Wen-Juan Xiang, Shanghai (CN); Dan-Ting Yin, Shanghai (CN); Olivier Haefliger, Geneva (CH)

(73) Assignee: Firmenich SA, Satigny (CH)

( * ) Notice: Subject to any disclaimer, the term of this patent is extended or adjusted under 35 U.S.C. 154(b) by 227 days.

(21) Appl. No.: 17/410,643

(22) Filed: Aug. 24, 2021

(65) Prior Publication Data

US 2022/0079196 A1 Mar. 17, 2022

Related U.S. Application Data

(62) Division of application No. 15/774,396, filed as application No. PCT/EP2016/078637 on Nov. 24, 2016, now Pat. No. 11,129,401.

(30) Foreign Application Priority Data

Nov. 24, 2015 (WO) ............... PCT/CN2015/095367
Nov. 23, 2016 (WO) ............... PCT/CN3016/106882

(51) Int. Cl.
*A23L 27/30* (2016.01)
*A23L 27/00* (2016.01)
*A23L 7/25* (2016.01)

(52) U.S. Cl.
CPC ............. *A23L 27/36* (2016.08); *A23L 7/25* (2016.08); *A23L 27/88* (2016.08); *A23V 2002/00* (2013.01)

(58) Field of Classification Search
CPC . A23L 27/36; A23L 27/88; A23L 7/25; A23V 2002/00
USPC .......................................................... 426/48
See application file for complete search history.

(56) References Cited

U.S. PATENT DOCUMENTS

2012/0214751 A1* 8/2012 Markosyan ............ A61Q 11/00
514/23

* cited by examiner

*Primary Examiner* — Brent T O'Hern
(74) *Attorney, Agent, or Firm* — Robert S. Dailey

(57) ABSTRACT

Provided herein is a method of improving the taste profile of a glucosylated terpene glycoside (GTG).

5 Claims, 2 Drawing Sheets

GLUCOSYLATED TERPENE GLYCOSIDES

CROSS-REFERENCE TO RELATED APPLICATIONS

The present application is a divisional application of U.S. patent application Ser. No. 15/774,396, filed May 8, 2018, which is the U.S. national stage application of PCT Application No. PCT/EP2016/078637, filed Nov. 24, 2016, which claims priority to PCT Application No. PCT/CN2015/095367, filed Nov. 24, 2015, and PCT Application No. PCT/CN2016/106882, filed Nov. 23, 2016.

FIELD

Provided herein are processes for preparing food ingredients, flavors and sweeteners from extracts of plants that contain terpene glycosides such as *Stevia rebaudiana* Bertoni, *Rubus suavissimus* or *Siraitia grosvenorii*. Further provided herein are formulations and uses of compositions made from the processes.

BACKGROUND

Natural sources of sweet compounds continue to be sought after as negative health effects generated by the ingestion of sugar by large populations continue to concern health officials and mankind in general. The trends towards obesity and obesity bear this out. The search for sweet plant extracts that have close to zero calorie contribution to a human's diet continues in order to find sweet and flavorful compounds that might replace sugars in order to reduce the instances of obesity, diabetes and cardiovascular diseases. Among others, steviol glycosides from *Stevia* (*Stevia rebaudiana* Bertoni) extracts, rubusoside from blackberry leaves (*Rubus suavissimus*) extracts, and mogrosides from monk fruit (*Siraitis grosvenorii*) extracts, have been advanced and reported as low calorie alternatives to sugar. However, these products continue to have negative attributes such as bitterness, lingering aftertaste, or licorice flavor. Some of these problems associated with replacing sugar with sweet extracts have been partially addressed by the transglucosylation of steviol glycosides using enzymes. However, many challenges to obtain a low calorie natural sweetener free of undesirable taste attributes still exist.

SUMMARY

Provided herein is a method of improving the taste profile of a glucosylated terpene glycoside (GTG) comprising:
a) mixing a malted cereal with a GTG in aqueous solution to form a GTG cereal mixture wherein the cereal comprises a glycosidase such as an amylase;
b) adjusting the temperature of the mixture to a temperature sufficient to activate the glycosidase and for a time sufficient to allow for a hydrolysis to proceed to form a mixture comprising glucosylated terpene glycosides wherein the average number of glucose units of the GTG in the GTG cereal mixture is reduced to form a GTG with a reduced average number of glucose units (GTGRG).

Also provided herein is a method of improving the taste of a *Stevia* extract comprising:
a) mixing a maltodextrin with a terpene glycoside in aqueous solution to form a terpene glycoside maltodextrin mixture;
b) maintaining the pH of the terpene glycoside maltodextrin mixture ranging from about 4 to about 8;
c) adding an transglucosylation enzyme to the mixture;
d) adjusting the temperature of the mixture sufficiently to activate the enzyme;
e) allowing a transglucosylation reaction in the maltodextrin mixture to form a GTG mixture with improved taste properties and
f) heating the GTG mixture to a temperature sufficient to inactivate the enzyme;
g) mixing a malted cereal with the GTG mixture in aqueous solution to form a GTG cereal mixture wherein the cereal comprises a glycosidase such as an amylase;
h) adjusting the temperature of the mixture to a temperature sufficient to activate the amylase and for a time sufficient to allow for a hydrolysis to proceed to form a GTG mixture comprising glucosylated terpene glycosides wherein the average number of glucose units of the GTG in the GTG cereal mixture is reduced.

DETAILED DESCRIPTION

Figure 1:
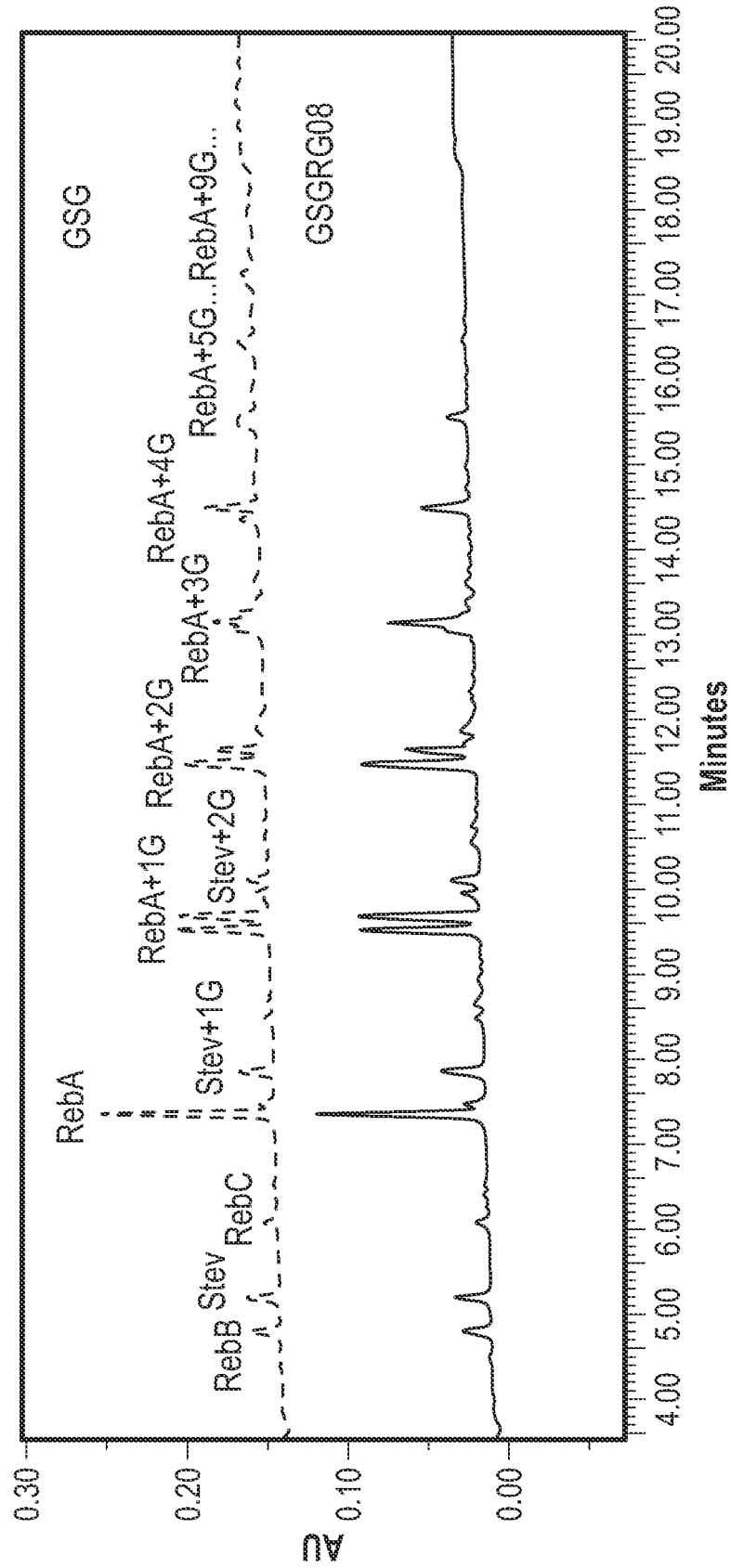
FIG. 1 shows HPLC chromatograms of glucosylated steviol glycosides (GSGs). Top: GSG derived from a *Stevia* extract containing predominantly rebaudioside A that has not been subjected to the novel process. Bottom: The same GSG after having been subjected to the novel process. The number of added glucose units has been reduced and analogs with more than 6 added glucose units are substantially absent.

For the descriptions herein and the appended claims, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of".

The term "glycoside" describes any organic compound to which one or more sugar units are covalently bound at one or more sites of the chemical structure.

In one embodiment the GTG is a glucosylated steviol glycoside (GSG) prepared by transglucosylation of steviol glycosides extracted from the *Stevia* plant (*Stevia rebaudiana* Bertoni). The resulting product is then a GSG with a reduced average number of glucose units (GSGRG).

In one embodiment, a GTG comprises from about 1 to about 12 added glucose units.

In one embodiment, the mixture comprising the GTGRG is heated to a temperature sufficient to deactivate the glycosidase.

In a further embodiment, solids are removed from the mixture comprising the GTGRG using means such as filtration, centrifugation, or other techniques known to those skilled in the art.

In another embodiment carbohydrates are removed from the mixture comprising the GTGRG using adsorption resins, precipitation, or other techniques known to those skilled in the art.

In one embodiment the glycosidase is selected from the group consisting of alpha-glucosidase, alpha-amylase, beta-amylase, glucan-1,4-alpha-glucosidase, glucan-1,4-alpha-maltohydrolase, glucan-1,4-alpha-maltotriohydrolase, glucan-1,4-maltohexaosidase, particularly the glycosidase is an amylase, more particularly a beta-amylase.

In one embodiment, the cereal provided herein is selected from the group consisting of wheat, barley, rye, sorghum, buckwheat, spelt, millet and oats; particularly the cerebral is barley. In one embodiment, the cereal is crushed.

The transglucosylation enzymes provided herein are those that can be used with maltodextrin as a sugar donor for example, including but not limited to cyclodextrin glycosyl transferase (CGTase, EC 2.4.1.19).

Further provided herein is a method of making beer comprising:
a) mixing a malted cereal with a GTG in aqueous solution to form a GTG cereal mixture wherein the cereal comprises a glycosidase
b) adjusting the temperature of the mixture to a temperature sufficient to activate the glycosidase and for a time sufficient to at least partially convert the starch present in the malted cereal to oligosaccharides and to form a mixture comprising glycosylated steviol glycosides wherein the average number of glucose units of the GTG in the GTG cereal mixture is reduced to yield a GTGRG; in particular the mixture is reduced for example by
c) optionally heating the mixture comprising the GTGRG to a temperature sufficient to deactivate the amylase;
d) filtering the mixture comprising the GTGRG to form a wort;
e) boiling the wort in the presence of hops;
f) cooling the wort;
g) adding yeast to the cooled wort and allow it to ferment to produce beer;
h) optionally separating the beer from any solid formed.

In one embodiment, the malted cereal is crushed.

In one embodiment, the ratio, by weight, of the GTG to cereal ranges from about 1:10000 to about 1000:1.

In one embodiment, The GTG mixtures made by the method provided herein are spray dried.

In one embodiment, the temperature for activating the transglucosylation enzyme ranges from 25° C. to 100° C. and more particularly from 50° C. to 90° C. In one embodiment the temperature for activating the transglucosylation enzyme is about 70° C. and more particularly at about 65° C.

In one embodiment, the temperature for deactivating the transglucosylation enzyme ranges from 100° C. to 150° C. and more particularly from 120° C. to 140° C. In one embodiment, the temperature for deactivating the transglucosylation enzyme is about 130° C. and more particularly at about 125° C.

A further GTG that may be used in the methods described herein, beyond GSG, is glucosylated rubusoside. Rubusoside provided herein may be obtained from, but not limited to blackberry leaves (*Rubus suavissimus*), containing substantially a single terpene glycoside called rubusoside, which is also found in low amounts in *Stevia*.

A further GTG may also be obtained by transglucosylation of an extract from monk fruit (Chinese name Luo Han Guo, Latin name *Siraitis grosvenorii*) which contains a mixture of triterpene glycosides.

The GTGRG or GTGRG mixtures obtained herein may be used to modify, enhance, confer, or improve the flavor of a flavor article.

The GTGRG or GTGRG mixtures obtained herein may be used to modify, enhance, confer or improve the sweetness of a flavor.

The GTGRG or GTGRG mixtures in the flavor article or flavor can be used in foodstuffs to enhance, confer, modify or improve the flavor and/or sweetness of the foodstuff.

In a particular embodiment provided herein is a flavoring composition comprising:
i) a GTGRG or GTGRG mixture as defined above;
ii) at least one ingredient selected from the group consisting of a flavor carrier and a flavor base; and
iii) optionally at least one flavor adjuvant.

By "flavor carrier" we mean here a material which is practically neutral from a flavor point of view, such that it does not significantly alter the organoleptic properties of flavoring ingredients. Said carrier may be a liquid or a solid.

As a liquid carrier one may cite, as non-limiting examples, an emulsifying system, i.e. a solvent and a surfactant system, or a solvent commonly used in flavors. A detailed description of the nature and type of solvents commonly used in flavor cannot be exhaustive. However, one can cite as a non-limiting example solvents, such as propylene glycol, triacetine, triethyl citrate, benzylic alcohol, ethanol, vegetal oils or terpenes.

As solid carrier one may cite, as non-limiting examples, absorbing gums or polymers, or yet encapsulating materials. Non-limiting examples of such materials may comprise wall-forming and plasticizing materials, such as mono, di- or trisaccharides, natural or modified starches, hydrocolloids, cellulose derivatives, polyvinyl acetates, polyvinylalcohols, proteins or pectins. Encapsulation techniques are known in the art, and may be performed, for instance, using techniques such as spray-drying, agglomeration or yet extrusion; or consists of a coating encapsulation, including coacervation and complex coacervation techniques.

By "flavor base" we mean here a composition comprising at least one flavoring co-ingredient.

Said flavoring co-ingredient is the GTGRG or GTGRG mixture as described above. Moreover, by "flavoring co-ingredient" it is meant here a compound, which is used in flavoring preparations or compositions to impart a hedonic effect. In other words such a co-ingredient, to be considered as being a flavoring one, must be recognized by a person skilled in the art as being able to impart or modify in a positive or pleasant way the taste of a composition, and not just as having a taste.

The nature and type of the flavoring co-ingredients present in the base do not warrant a more detailed description here, which in any case would not be exhaustive, the skilled person being able to select them on the basis of its general knowledge and according to intended use or application and the desired organoleptic effect. In general terms, these flavoring co-ingredients belong to chemical classes as varied as alcohols, aldehydes, ketones, esters, ethers, acetates, nitriles, terpenoids, nitrogenous or sulphurous heterocyclic compounds and essential oils, and said perfuming co-ingredients can be of natural or synthetic origin. Many of these co-ingredients are in any case listed in reference texts such as the book by S. Arctander, Perfume and Flavor Chemicals, 1969, Montclair, New Jersey, USA, or its more recent versions, or in other works of a similar nature, as well as in the abundant patent literature in the field of flavor. It is also understood that said co-ingredients may also be compounds known to release in a controlled manner various types of flavoring compounds.

By "flavor adjuvant" we mean here an ingredient capable of imparting additional added benefit such as a color, a particular light resistance, chemical stability, etc. A detailed description of the nature and type of adjuvant commonly used in flavoring bases cannot be exhaustive, but it has to be mentioned that said ingredients are well known to a person skilled in the art.

Moreover, a GTGRG or GTGRG mixture as defined herein can be advantageously incorporated into flavored articles to positively impart, or modify, the taste of said articles. In one embodiment, the taste of the article is modified for example to reduce bitterness and off-notes. In another embodiment provided herein is an improvement in mouthfeel of a flavored article or foodstuff. In another embodiment provided herein is an improvement in the taste or sweetness of a flavored article or foodstuff particularly when the GTGRG or GTGRG mixture modulates (e.g., increases) the sweetness of a sweet compound such as sucrose. Consequently, a flavored article comprising:
  i) as flavoring ingredient, a GTGRG or GTGRG mixture as described above; and
  ii) a foodstuff base;
  is also provided herein.

Suitable foodstuffs, e.g. foods or beverages are also provided herein.

For the purpose of the present invention, "foodstuff base" means an edible product, e.g. a food or a beverage. Therefore, a flavored article provided herein comprises the functional formulation, as well as optionally additional benefit agents, corresponding to a desired edible product, e.g. a savory cube, and a flavor effective amount of at least one compound according to the invention. The compositions and methods provided herein have use in food or beverage products. When the food product is a particulate or powdery food, the dry particles may easily be added thereto by dry-mixing. Typical food products are selected from the group consisting of an instant soup or sauce, a breakfast cereal, a powdered milk, a baby food, a powdered drink, a powdered chocolate drink, a spread, a powdered cereal drink, a chewing gum, an effervescent tablet, a cereal bar, and a chocolate bar. The powdered foods or drinks may be intended to be consumed after reconstitution of the product with water, milk and/or a juice, or another aqueous liquid.

The food product may be selected from the group consisting of condiments, baked goods, powdery food, bakery filings and fluid dairy products.

Condiments include, without limitation, ketchup, mayonnaise, salad dressing, Worcestershire sauce, fruit-flavored sauce, chocolate sauce, tomato sauce, chili sauce, and mustard.

Baked goods include, without limitation, cakes, cookies, pastries, breads, donuts and the like.

Bakery fillings include, without limitation, low or neutral pH fillings, high, medium or low solids fillings, fruit or milk based (pudding type or mousse type) fillings, hot or cold make-up fillings and nonfat to full-fat fillings.

Fluid dairy products include, without limitation, non-frozen, partially frozen and frozen fluid dairy products such as, for example, milks, ice creams, sorbets and yogurts.

Beverage products include, without limitation, carbonated soft drinks, including cola, lemon-lime, root beer, heavy citrus ("dew type"), fruit flavored and cream sodas; powdered soft drinks, as well as liquid concentrates such as fountain syrups and cordials; coffee and coffee-based drinks, coffee substitutes and cereal-based beverages; teas, including dry mix products as well as ready-to-drink teas (herbal and tealeaf based); fruit and vegetable juices and juice flavored beverages as well as juice drinks, nectars, concentrates, punches and "ades"; sweetened and flavored waters, both carbonated and still; sport/energy/health drinks; alcoholic beverages plus alcohol-free and other low-alcohol products including beer and malt beverages, cider, and wines (still, sparkling, fortified wines and wine coolers); other beverages processed with heating (infusions, pasteurization, ultra high temperature, ohmic heating or commercial aseptic sterilization) and hot-filled packaging; and cold-filled products made through filtration or other preservation techniques.

The nature and type of the constituents of the foodstuffs or beverages do not warrant a more detailed description here, which in any case would not be exhaustive, the skilled person being able to select them on the basis of his general knowledge and according to the nature of said product.

The proportions in which the compound according to the invention can be incorporated into the various aforementioned articles or compositions vary within a wide range of values. These values are dependent on the nature of the article to be flavored and on the desired organoleptic effect as well as the nature of the co-ingredients in a given base when the compounds according to the invention are mixed with flavoring co-ingredients, solvents or additives commonly used in the art.

In the case of flavoring compositions, typical concentrations are in the order of 0.0001% to 1% by weight, or even more, of the compounds of the invention based on the weight of the consumer product into which they are incorporated. Concentrations lower than these, such as in the order of 0.001% to 0.5% by weight, can be used when these compounds are incorporated into flavored articles, percentage being relative to the weight of the article.

The following examples are for illustrative purposes only and are not meant to limit the scope of the invention as provided herein and as described in the claims.

EXAMPLES

Example 1

Reduction of the Average Number of Glucose Units of a GSG Derived from a *Stevia* Extract Containing Predominantly Rebaudioside A 696 g of GSG derived from a *Stevia* extract containing predominantly rebaudioside A (RebA) were dissolved in 2775 g water. 48 g of crushed malted barley were added. The mixture was allowed to react at 62° C. for 30 min. The enzyme was deactivated at 78° C. for 15 min. Solids, mainly coming from residual crushed malted barley, were removed by dead-end filtration using a 10 μm filter. The resulting clear water solution (3400 g) was spray-dried to afford 632 g of dry product called GSGRG08. The GSG starting material and the GSGRG obtained after the reaction were analyzed by HPLC with UV detection as displayed in FIG. 1. FIG. 1 shows that GSGRG08 has a reduced degree of glucosylation compared to the GSG used as starting material.

Example 2

Figure 2:
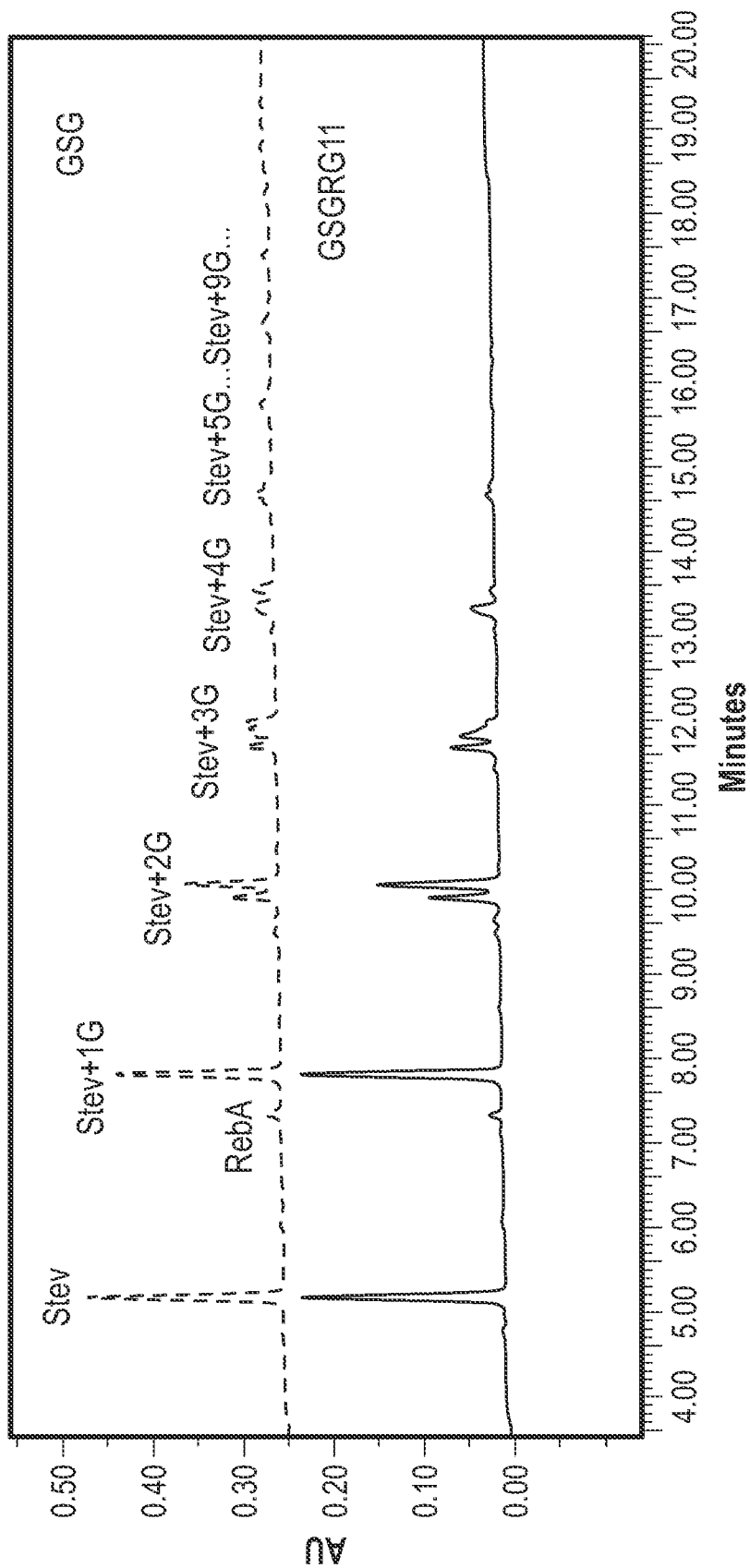
FIG. 2 shows HPLC chromatograms of GSGs. Top: GSG derived from a *Stevia* extract containing predominantly stevioside that has not been subjected to the novel process. Bottom: The same GSG after having been subjected to the novel process. The number of added glucose units has been reduced and analogs with more than 6 added glucose units are substantially absent.

Reduction of the Average Number of a GSG Derived from a *Stevia* Extract Containing Predominantly Stevioside 720 g of GSG derived from a *Stevia* (SG) extract containing predominantly stevioside were dissolved in 2755 g water. 48 g of crushed malted barley were added. The mixture was allowed to react at 62° C. for 30 min. The enzyme was deactivated at 78° C. for 15 min. Solids, mainly coming from residual crushed malted barley, were removed by dead-end filtration using a 10 µm filter. The resulting clear water solution was spray-dried to afford 664 g of dry product called GSGRG11. The GSG starting material and the product obtained after the reaction were analyzed by HPLC with UV detection as displayed in FIG. 2. FIG. 2 shows that GSGRG11 has a reduced degree of glucosylation compared to the GSG used as starting material.

Example 3

Modification of a GSG Derived from a SG Extract Containing a Balanced Ratio of RebA and Stevioside Along with Other Steviol Glycosides 10 g of GSG derived from a *Stevia* extract containing a balanced ratio of RebA and stevioside along with other steviol glycosides were dissolved in 30 mL water. 0.625 g of crushed malted barley were added. The mixture was allowed to react at 62° C. for 24 h. The enzyme was deactivated at 78° C. for 15 mins. Solids, mainly coming from residual crushed malted barley, were removed by filtration using a 0.2 µm membrane filter. The resulting clear water solution was freeze-dried to afford 8.8 g of dry product called GSGRG01. Analysis by HPLC with UV detection showed that GSGRG01 has a reduced degree of glycosylation compared to the GSG used as starting material.

Example 4

Preference of Consumers for a GSGRG Vs the Matching GSG—Evaluation of GSGRGs by Consumers Vs the Matching GSG by "Paired Comparison" Test 30 trained panelists received each one cup containing a 125 ppm in water solution of the GSG starting material used in Example 2 and another cup containing a 125 ppm in water solution of GSGRG11 the GSGRG prepared as described in Example 2. The two cups were presented in randomized order. The panelists were asked to say which sample they preferred. 25 panelists said they preferred the GSGRG and only 5 panelists said they preferred the GSG used as a starting material. The difference is significant at 0.0003 with an alpha risk at 5.0% under two-tailed analysis.

Example 5

Comparison of the Sweetness-Enhancing Effect of a GSGRG Vs the Matching GSG—Evaluation by "Modified Different from Control" Test 29 trained panelists were asked to taste a first cup containing a 4% sucrose solution defined as a reference for sweetness intensity, with an arbitrarily set value of 0. The panelists then received two additional cups in randomized order. One contained an aqueous solution containing 125 ppm of the GSG used as starting material in Example 3 dissolved in a 4% sucrose aqueous solution, and the other one contained only 100 ppm of GSGRG01 the GSGRG prepared as described in Example 3 dissolved in a 4% sucrose aqueous solution.

The panelists were asked to rate the sweetness intensity of these two samples on a scale of −5 (no sweetness) to 5 (extremely strong sweet taste) against the reference set at 0. The panelists rated both samples with the same sweetness intensity of 1.4. This result demonstrates that GSGRGs prepared by the novel technology can be used at a lower dosage than standard GSGs without any detrimental impact on the magnitude of the sweetness enhancing effect.

Example 6

Reduction of the Average Number of Glucose Units of a GSG Derived from a *Rubus Suavissimus* Extract Containing Predominantly Rubusoside 855 g of GSG derived from a *Rubus suavissimus* extract containing predominantly rubusoside were dissolved in 1200 g water. 51 g of crushed malted barley were added. The mixture was allowed to react at 62° C. for 30 min. The enzyme was deactivated at 78° C. for 15 min. Solids, mainly coming from residual crushed malted barley, were removed by dead-end filtration using a 10 µm filter. 1L of the resulting clear water solution was spray-dried to afford 250 g of dry product called GSGRG14. Analysis by HPLC with UV detection showed that GSGRG14 has a reduced degree of glycosylation compared to the GSG used as starting material.

The invention claimed is:

1. A method of improving a taste of a plant extract, the method comprising:
   a) mixing a maltodextrin with a plant extract containing terpene glycosides in aqueous solution to form a mixture comprising the plant extract containing glycosides and maltodextrin;
   b) maintaining the mixture at a pH ranging from 4 to 8;
   c) adding a transglucosylation enzyme to the mixture;
   d) adjusting a temperature of the mixture sufficiently to activate the transglucosylation enzyme;
   e) allowing a transglucosylation reaction in the mixture to form a glucosylated terpene glycoside mixture;
   f) heating the glucosylated terpene glycoside mixture to a temperature sufficient to inactivate the transglucosylation enzyme;
   g) mixing a malted cereal with the glucosylated terpene glycoside mixture in an aqueous medium to form a glucosylated terpene glycoside and malted cereal mixture wherein the malted cereal comprises a glycosidase;
   h) adjusting a temperature of the mixture to a temperature sufficient to activate the glycosidase and for a time sufficient to allow for a hydrolysis reaction to proceed and to form a hydrolyzed mixture comprising a glucosylated terpene glycosides having a reduced average number of glucose units; and
   i) optionally heating the hydrolyzed mixture to a temperature sufficient to deactivate the glycosidase.

2. The method as recited in claim 1 wherein the glycosidase comprises an amylase.

3. The method as recited in claim 1 wherein the glycosidase comprises a beta-amylase.

4. The method as recited in claim 1 wherein the malted cereal is selected from the group consisting of malted wheat, malted barley, malted rye, malted sorghum, malted buckwheat, malted spelt, malted millet and malted oats.

5. The method as recited in claim 4 wherein the malted cereal is the malted barley.

* * * * *